United States Patent
Ng-Thow-Hing et al.

(10) Patent No.: US 9,613,459 B2
(45) Date of Patent: Apr. 4, 2017

(54) SYSTEM AND METHOD FOR IN-VEHICLE INTERACTION

(71) Applicant: Honda Motor Co., Ltd., Tokyo (JP)

(72) Inventors: Victor Ng-Thow-Hing, Sunnyvale, CA (US); Karlin Bark, Menlo Park, CA (US); Cuong Tran, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 14/135,036

(22) Filed: Dec. 19, 2013

(65) Prior Publication Data
US 2015/0178990 A1 Jun. 25, 2015

(51) Int. Cl.
  *G06T 19/00* (2011.01)
  *G06K 9/00* (2006.01)
  *G06F 3/01* (2006.01)
  *G06F 3/147* (2006.01)
(52) U.S. Cl.
  CPC ............ *G06T 19/006* (2013.01); *G06F 3/011* (2013.01); *G06F 3/147* (2013.01); *G06K 9/00671* (2013.01)
(58) Field of Classification Search
  CPC .......................... G06T 19/006; G06K 9/00671
  See application file for complete search history.

(56) References Cited

U.S. PATENT DOCUMENTS

| | | | |
|---|---|---|---|
| 7,796,155 B1 | 9/2010 | Neely, III et al. | |
| 8,098,170 B1* | 1/2012 | Szczerba | G02B 27/01 340/438 |
| 8,098,171 B1* | 1/2012 | Szczerba | B60Q 9/008 340/438 |
| 8,280,405 B2 | 10/2012 | Sanz-Pastor et al. | |
| 8,317,329 B2 | 11/2012 | Seder et al. | |
| 2006/0288376 A1* | 12/2006 | Vitito | B60K 35/00 725/75 |
| 2007/0047780 A1* | 3/2007 | Hull | G06K 9/00442 382/124 |
| 2007/0194902 A1* | 8/2007 | Blanco | G01C 21/365 340/461 |

(Continued)

OTHER PUBLICATIONS

Reitmayr et al. "Collaborative Augmented Reality for Outdoor Navigation and Information Browsing," 2004, Proceedings of the Second Symposium on Location Based Services and TeleCartography, TU Wien, 53-62, https://www.ims.tuwien.ac.at/publications/tuw-137965.*

*Primary Examiner* — Ryan Barrett
(74) *Attorney, Agent, or Firm* — Rankin, Hill & Clark LLP (57) ABSTRACT

A system and method for interaction in a vehicle includes establishing a bi-directional interaction session between a first display and a second display via a communication link, wherein each of the first display and the second display are communicatively coupled to the vehicle and the first display is operated by a first user and the second display is operated by a second user. Upon receiving a first interaction input associated generating a first augmented reality object based on the first interaction input and transmitting via the communication link the first augmented reality object to the second display. Upon receiving a second interaction input, generating a second augmented reality object based upon the second interaction input and transmitting via the communication link the second augmented reality object to the first display.

15 Claims, 6 Drawing Sheets

(56) References Cited

U.S. PATENT DOCUMENTS

| | | | |
|---|---|---|---|
| 2008/0080076 A1* | 4/2008 | Hutzel | B60Q 3/023 359/871 |
| 2008/0158096 A1 | 7/2008 | Breed | |
| 2008/0158510 A1* | 7/2008 | Tant | B60K 35/00 353/14 |
| 2009/0005961 A1* | 1/2009 | Grabowski | G01C 21/365 701/532 |
| 2010/0253539 A1* | 10/2010 | Seder | G01S 13/723 340/903 |
| 2010/0253593 A1* | 10/2010 | Seder | G01S 13/723 345/7 |
| 2010/0253596 A1* | 10/2010 | Szczerba | G01S 13/723 345/7 |
| 2010/0253602 A1* | 10/2010 | Szczerba | G01S 13/723 345/8 |
| 2010/0289632 A1* | 11/2010 | Seder | G01S 13/723 340/436 |
| 2010/0292886 A1* | 11/2010 | Szczerba | G01C 21/365 701/31.4 |
| 2011/0052009 A1* | 3/2011 | Berkovich | G02B 27/01 382/106 |
| 2012/0089273 A1* | 4/2012 | Seder | B60Q 1/268 701/2 |
| 2012/0169513 A1* | 7/2012 | Szczerba | G02B 27/01 340/905 |
| 2012/0169572 A1* | 7/2012 | Seder | B60R 1/00 345/7 |
| 2012/0169861 A1* | 7/2012 | Szczerba | G02B 27/01 348/78 |
| 2012/0173067 A1* | 7/2012 | Szczerba | G02B 27/01 701/23 |
| 2012/0173069 A1* | 7/2012 | Tsimhoni | G01C 21/365 701/25 |
| 2012/0174004 A1* | 7/2012 | Seder | G02B 27/01 715/764 |
| 2012/0224060 A1* | 9/2012 | Gurevich | B60R 1/00 348/148 |
| 2012/0249592 A1 | 10/2012 | Sanders-Reed et al. | |
| 2013/0083061 A1 | 4/2013 | Mishra et al. | |
| 2013/0143601 A1* | 6/2013 | Ricci | G06F 9/54 455/456.3 |
| 2013/0162639 A1* | 6/2013 | Muench | G06T 19/006 345/419 |
| 2013/0293468 A1* | 11/2013 | Perez | G06F 3/033 345/158 |
| 2014/0063064 A1* | 3/2014 | Seo | G08G 1/166 345/633 |
| 2014/0098130 A1* | 4/2014 | Fein | G06T 19/006 345/633 |
| 2014/0152697 A1* | 6/2014 | Shin | G02B 27/01 345/633 |
| 2014/0164322 A1* | 6/2014 | Beaurepaire | G06F 17/30575 707/610 |
| 2015/0074506 A1* | 3/2015 | Dunn | G06F 21/6218 715/230 |

* cited by examiner

SYSTEM AND METHOD FOR IN-VEHICLE INTERACTION

BACKGROUND

Interaction between a driver and one or more passengers in a vehicle can lead to distracted driving. One form of distracted driving is driver inattention. Driver inattention can result from passengers interacting with the driver, or vice-versa, thereby diverting the driver's attention away from the primary task of driving (e.g., diverting the driver's eye gaze away from the road). Additionally, use of vehicle infotainment systems and connected vehicle technology by the driver and passengers can further magnify distracted driving. In some situations, interaction between the driver and passengers is an attempt to assist the driver in navigation or alert the driver to a point of interest. This type of interaction can create a collaborative driving experience if the interaction is executed in a safe manner.

BRIEF DESCRIPTION

According to one aspect, a method for interaction in a vehicle includes establishing a bi-directional interaction session between a first display and a second display via a communication link. Each of the first display and the second display are communicatively coupled to the vehicle and the first display is operated by a first user and the second display is operated by a second user. Upon receiving a first interaction input associated with the first user, the method includes generating a first augmented reality object based on the first interaction input and transmitting via the communication link the first augmented reality object to the second display for displaying the first augmented reality object on the second display. Upon receiving a second interaction input associated with the second user, the method includes generating a second augmented reality object based upon the second interaction input and transmitting via the communication link the second augmented reality object to the first display for displaying the second augmented reality object on the first display.

According to another aspect, a non-transitory computer-readable medium stores instructions that, when executed by a vehicle computer, causes the computer to perform the steps of establishing a bi-directional interaction session between a first display and a second display via a communication link. Each of the first display and the second display are communicatively coupled to the vehicle and the first display is operated by a first user and the second display is operated by a second user. Upon receiving a first interaction input associated with the first user, the steps include generating a first augmented reality object based on the first interaction input and transmitting via the communication link the first augmented reality object to the second display for displaying the first augmented reality object on the second display. Upon receiving a second interaction input associated with the second user, the steps include generating a second augmented reality object based upon the second interaction input and transmitting via the communication link the second augmented reality object to the first display for displaying the second augmented reality object on the first display.

According to a further aspect, a system for interaction in a vehicle includes a first display and a second display each communicatively coupled to the vehicle and each configured for bi-directional interaction between the first display and the second display, wherein the first display is operated by a first user and the second display is operated by a second user. The system includes an interaction module for receiving a first interaction input associated with the first user and a second interaction input associated with the second user. The system includes an augmented reality module for generating a first augmented reality object based on the first interaction input and rendering the first augmented reality object on the second display and for generating a second augmented reality object based on the second interaction input and rendering the second augmented reality object on the second display.

DETAILED DESCRIPTION

The embodiments describe herein include definitions of selected terms employed herein. The definitions include various examples and/or forms of components that fall within the scope of a term and that can be used for implementation. The examples are not intended to be limiting. Further, one having ordinary skill in the art will appreciate that the components discussed herein, can be combined, omitted or organized with other components or into organized into different architectures.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices or computing components (e.g., computer, personal digital assistant, cellular telephone, network device, modules) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output module" (I/O), as used herein, represents hardware and software providing input and output into and from the exemplary computer systems and devices. Input can be received through a cursor controller, a mouse, a keyboard, a touch screen, audio sensors, image sensors and other mechanisms adapted to communicate information or commands to a processor or a memory. Output can be provided to devices such as a computer screen, a monitor, a touch screen, a navigation display, a portable device screen, and any other similarly equipped display devices, among others. The I/O module also facilitates computer communication with other components of the computer system and other networks (e.g., the Internet, vehicle local networks, Wide Local Area Networks).

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

An "interaction input", as used herein, refers to data that is entered or sent by a user to a processor (e.g., via an I/O module) for processing thereby allowing the processor to execute a command or generate output based on the data. User input can take various forms (e.g., multi-modal) and can be sent to the processor using an input device. For example, user input can be sent via a keyboard, a mouse, a touch screen, a joystick, other tactile devices, among others. User input can also take the form of speech or gesture input detected by sensors and processed by speech or gesture recognition systems. Gesture and speech recognition systems as well as geospatial databases can be utilized for speech and gesture processing.

In another embodiment, "interaction input" refers to data that is returned by a computer system to a processor (e.g., via an I/O module) for processing thereby allowing the processor to execute a command or generate output based on the data. Interaction input can take various forms, for example, a result returned from a query to a search engine, a result returned from a query to a database, a response from a navigation unit (e.g., GPS), among others.

A "vehicle", as used herein, refers to any machine capable of carrying one or more human occupants and is powered by any form of energy. The term "vehicle" includes, but is not limited to: cars, trucks, vans, minivans, airplanes, all-terrain vehicles, multi-utility vehicles, lawnmowers and boats.

System Overview

Figure 1:
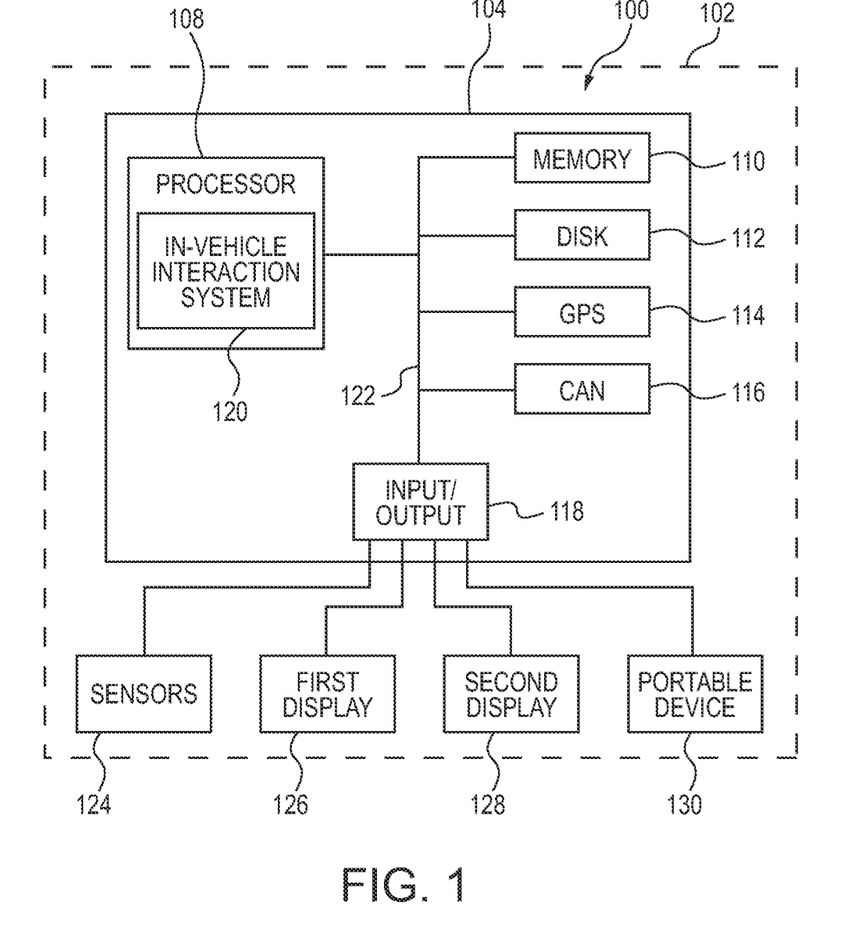
FIG. 1 is a schematic view of a system for interaction in a vehicle according to an exemplary embodiment.

Referring now to the drawings wherein the showings are for purposes of illustrating one or more exemplary embodiments and not for purposes of limiting same, FIG. 1 illustrates a system for interaction in a vehicle generally indicated by reference numeral 100. The system 100 is implemented in or in association with a vehicle 102. Specifically, the system 100 can be implemented alone or in combination with a vehicle computing device 104 (e.g., a navigation system, an infotainment system, a portable device, etc.). The components of system 100, as well as the components of other systems and architectures discussed herein, can be combined, omitted or organized into different architectures for various embodiments.

In the illustrated embodiment shown in FIG. 1, the vehicle computing device 104 includes a processor 108, a memory 110, a disk 112, a global positioning system (GPS) 114, a Controller Area Network (CAN) 116 and an input/output (I/O) module 118. The processor 108 includes an in-vehicle interaction system 120, which will be discussed in further detail below with reference to FIG. 3, for facilitating interaction between a driver and one or more passengers. The components of the system 100 and the vehicle computing system 104 can be operably connected for computer communication via a bus 122 and/or other known wired and wireless technologies.

In the illustrated embodiment of FIG. 1, the I/O module 118 facilitates data input and output between the components of the vehicle computing device 104 and a plurality of sensors 124, a first display 126, a second display 128 and a portable device 130. The I/O module 118 can include provisions for establishing an operable connection between the components of the system 100 with the Internet (not shown) and/or other external networks (not shown) thereby enabling data transfer and processing in a connected vehicle architecture. The connected vehicle architecture can be enabled directly from the I/O module 118 or via another source, for example, a WiFi or cellular network provided by the portable device 130. In one embodiment, which will be described in more detail herein, the first display 126 and the second display 128 are each communicatively coupled to the vehicle 102 and each configured for bi-directional interaction between the first display 126 and the second display 128.

In the illustrated embodiment of FIG. 1, the plurality of sensors 124 are disposed within the vehicle 102 and/or are communicatively coupled to the vehicle 102. The sensors 124 are configured for sensing, monitoring and processing data associated with the vehicle 102. Specifically, the sensors 126 sense a stimulus and generate data (e.g., a data signal) representing the stimulus. The sensors 124 can include, but are not limited to, radar-based sensors, vision based detection sensors (e.g., cameras), light based sensors, and audio based sensors (e.g., microphones) and vehicle system sensors.

The data from the sensors 126 is transmitted directly to the in-vehicle interaction system 120 and/or is transmitted to the in-vehicle interaction system 120 via the I/O module 118. Data can include, but is not limited to, image data, audio data, touch data, gesture recognition data, vehicle system data and environmental data. For example, image data can include camera images, depth images and/or video stream data, among others. The image data can capture portions of the interior environment of the vehicle 102, the driver and one or more passengers, the exterior of the vehicle 102 and the surrounding environment of the vehicle 102, among others. Audio data can include speech and sound data associated with the driver and one or more passengers, among others. Touch data can include touch input data received at the first display 126 and/or the second display 128, among others. Gesture recognition data can include the image data described above as well as data from tracking systems, including, but not limited to eye gaze tracking, gesture tracking, posture tracking, among others. Operating data can include data from vehicle systems of the vehicle 102, including, but not limited to, vehicle speed data, braking data, steering angles, vehicle location data (e.g., GPS data, map data, navigation system data), vehicle diagnostic data, data generated by processors associated with the first display 126 and/or the second display 128, among others. The data described above can also be obtained as input or output from other sources, for example, the portable device 130, sensors located in the portable device 130, the Internet, an external network, a database (e.g., the disk 121), among others.

As will be discussed in further detail herein, the data from the sensors 124 is used in part for determining and receiving interaction input and generating visual feedback (e.g., augmented reality objects) on the first display 126 and/or the second display 128. In the illustrated embodiment of FIG. 1, the data obtained from the sensors 124 can be displayed by the vehicle computing device 104 (e.g., as output by the I/O module 118). In particular, the data can be displayed as least in part as output on the first display 126 and/or the second display 128 for visual feedback. The data can also be used to generate other data, augmented reality objects, computer generated views to be output on the first display 126 and the second display 128. Although the embodiments discussed herein refer to a first display 126 and a second display 128, other embodiments can generally include one display or more than two displays.

In the illustrated embodiment of FIG. 1, the first display 126 and the second display 128 can be located within the vehicle 102 or located remotely from the vehicle 102. For example, the first display 126 and the second display 128 can be integrated with the vehicle computing system 104 (e.g., as part of a telematics device, navigation device) or can be integrated with stand-alone devices (e.g., a portable device 130 located inside or outside of the vehicle 102). It will be appreciated that in the case of a stand-alone device, for example, the portable device 130, the device includes similar components and functionality for computing as the vehicle computing device 104.

The first display 126 and the second display 128 are each communicatively coupled to the vehicle 102 and each configured for bi-directional interaction between the first display 126 and the second display 128. The first display can be operated by a first user (e.g., a driver, a passenger) and the second display can be operated by a second user (e.g., a driver, a passenger). Accordingly, as will be discussed herein, the in-vehicle interaction system 120, the first display 126 and the second display 128 provide various functions to facilitate interaction in the vehicle 102 between the first user and the second user.

Figure 2:
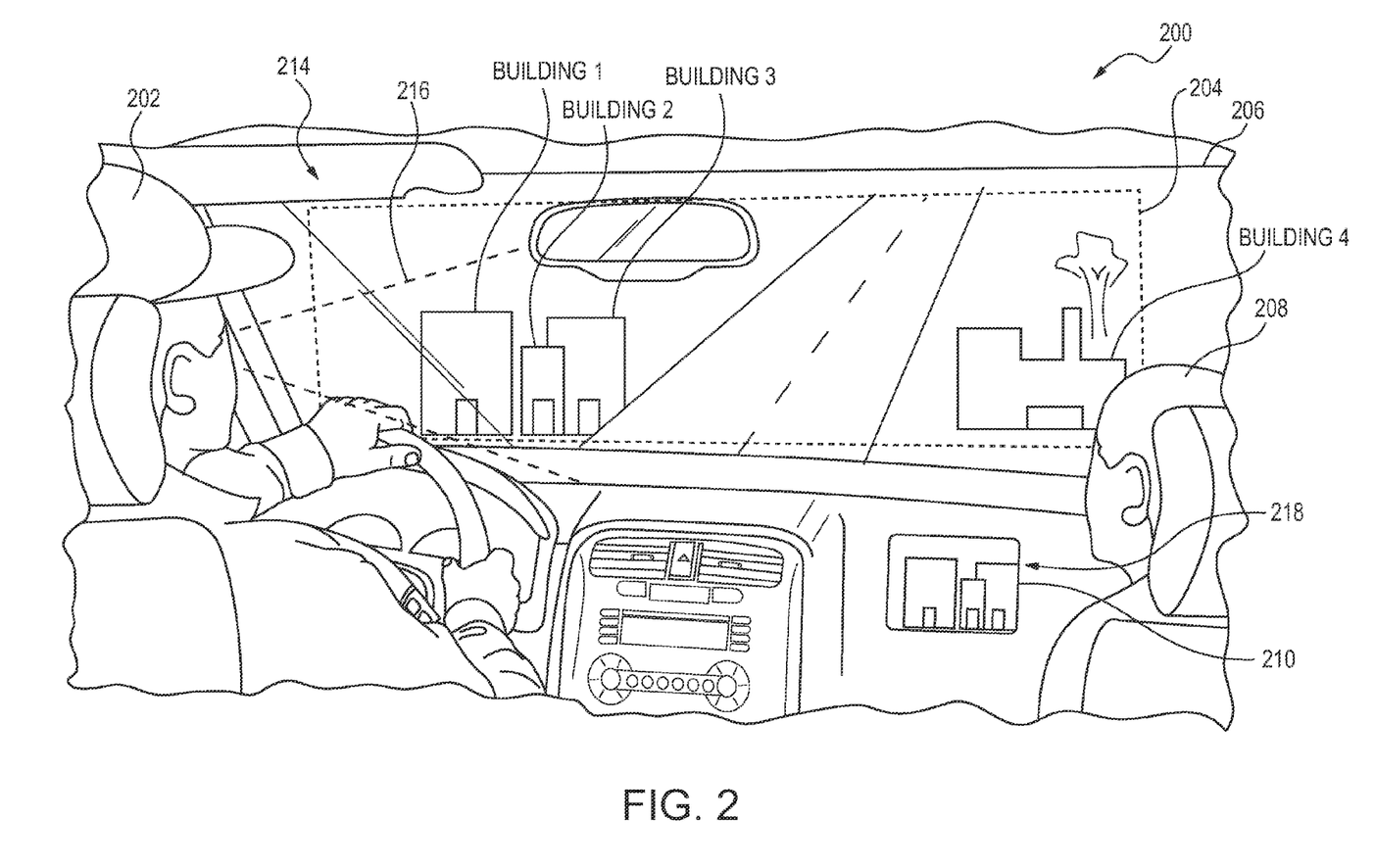
FIG. 2 is a schematic view of a vehicle implementing a system for interaction according an exemplary embodiment.

As discussed above, the system for interaction in a vehicle includes a first display 126 and a second display 128 each communicatively coupled to the vehicle 102 and each configured for bi-directional interaction between the first display 126 and the second display 128. In one embodiment, the first display is operated by a first user and the second display is operated by a second user. In a further embodiment, one of the first display or the second display is a driver display operated by a driver of the vehicle and the other of the first display or the second display is a passenger display operated by a passenger of the vehicle. Referring now to FIGS. 2, 3A-3D and 4A-4D with reference to the components of FIG. 1 an embodiment of the system 102 in the vehicle 102 will now be described in more detail. Throughout the detailed description, FIGS. 2, 3A-3D and 4A-4D will be referred to for illustrative examples of interaction in a vehicle according to embodiments discussed herein and are not intended to be limiting. FIG. 2 illustrates an interior view of the vehicle 102 generally indicated by reference numeral 200. In this example, a driver 202 can view and/or operate a heads-up display (HUD) 204 projected on a front windshield 206 of the vehicle 102, and a passenger 208 can view and/or operate a passenger display 210 mounted in the vehicle 102. A driver view is generally indicated by numeral 214 and is a local view perceivable to the driver through the front windshield 206 and the HUD 204. For example, the driver's view 214 (i.e., the driver's local view) includes real images (e.g., a building 1, a building 2, a building 3, a building 4) viewable through the HUD 204 and virtual and/or augmented data projected on the HUD 204 (shown in FIGS. 2B and 2C). In some embodiments, other passengers in the vehicle 102 can also view portions of the driver view 214. A passenger view is generally indicated by a numeral 218 and includes a local view perceivable to the passenger on the passenger display 210. For example, in FIG. 2, the passenger view 218 (i.e., the passenger's local view) includes images and data rendered for display on the passenger display 210. In some embodiments, other passengers in the vehicle 102 can also view portions of the passenger view 218 displayed on the passenger display 210.

FIGS. 3A-3D, and 4A-4D illustrate other exemplary embodiments and for simplicity only include portions of the view 200 of FIG. 2. In the illustrated embodiments discussed herein, the HUD 204 can represent a first display 126 and the passenger display 210 can represent a second display 128, or vice-versa. Specifically, one of the first display 126 and the second display 128 is a driver display operated by a driver of the vehicle and the other of the first display 126 or the second display 128 is a passenger display operated by a passenger of the vehicle. Further, the HUD 204 and the passenger display 210 are not limited to the configurations and locations as illustrated in FIGS. 2, 3A-3D and 4A-4D and. For example, the driver 202 could view and/or operate a different display (e.g., a display on a portable device located in the vehicle 102) instead of the HUD 204. In another example, the passenger display 210 could be a handheld device mounted in another location within the vehicle 102.

The In-Vehicle Interaction System and Examples

Figure 4A:
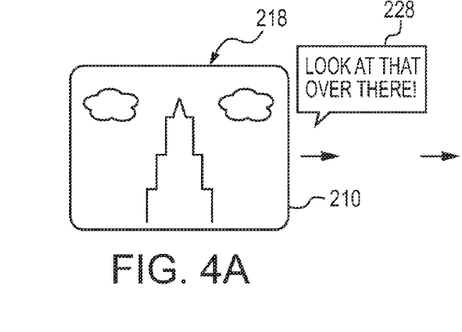
FIG. 4A is a simplified schematic view of the vehicle similar to FIG. 2, but showing a passenger view according to another exemplary embodiment.
Figure 4B:
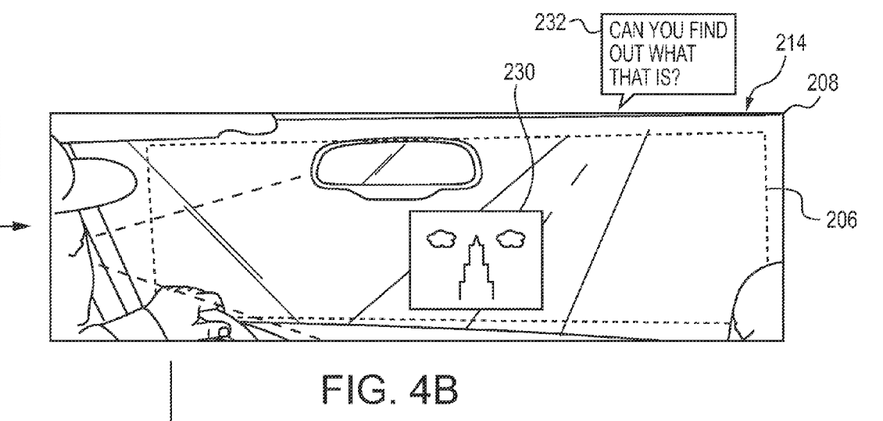
FIG. 4B is a simplified schematic view of the vehicle similar to FIG. 2, but showing a driver view according to another exemplary embodiment.
Figure 4C:
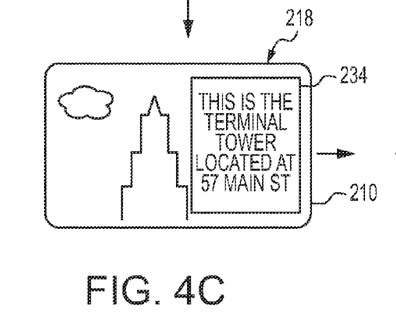
FIG. 4C is a simplified schematic view of the vehicle similar to FIG. 2, but showing a passenger view according to another exemplary embodiment.
Figure 4D:
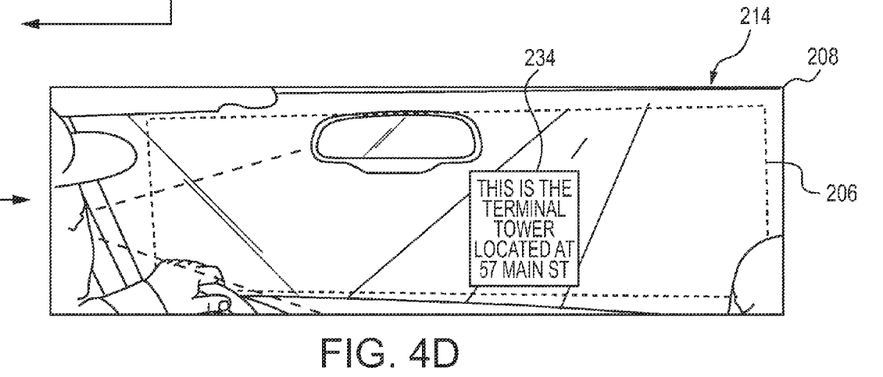
FIG. 4D is a simplified schematic view of the vehicle similar to FIG. 2, but showing a driver view according to another exemplary embodiment.
Figure 5:
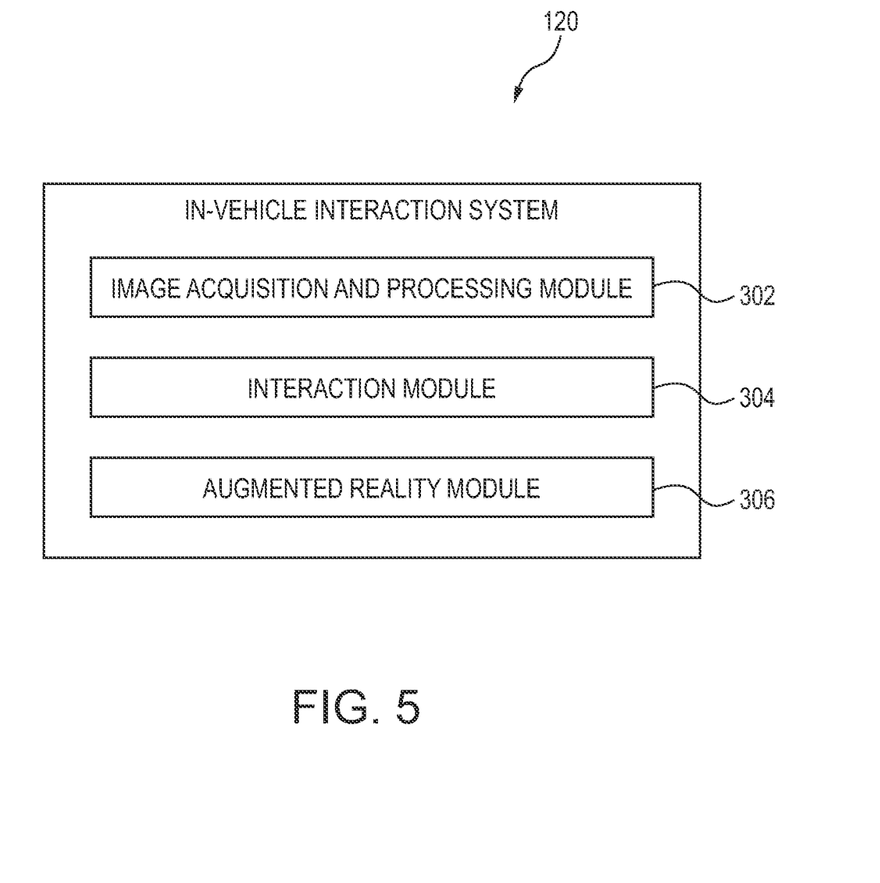
FIG. 5 is a detailed schematic view of the in-vehicle interaction system of FIG. 1.

Referring now to FIG. 5, the in-vehicle interaction system 120 will be discussed in more detail according to an exemplary embodiment with further reference to FIG. 1 and the examples illustrated in FIGS. 2, 3A-3D and 4A-4DAs discussed above with FIG. 1, the in-vehicle interaction system 120 includes a first display 126 and a second display 128 each communicatively coupled to the vehicle 102 and each configured for bi-directional interaction between the first display 126 and the second display 128. The in-vehicle interaction system 120 further includes an image acquisition and processing module 302, an interaction module 304 and an augmented reality module 306.

The image acquisition and processing module 302 is configured to receive and process data from the plurality of sensors 124 disposed for monitoring data associated with the vehicle 102. In some embodiments, the image acquisition and processing module 302 and the interaction module 204 can include provisions for gesture recognition, speech recognition, eye-tracking, head-tracking, among others, utilizing data received from the sensors 124.

In one embodiment, the interaction module 304 is configured for establishing a bi-directional interaction session and is configured for receiving interaction input. The bi-directional interaction session enables real-time display and augmentation of data and views between the first display 126 and the second display 128. The bi-directional interaction session can be implemented via wired or wireless technologies (i.e., a communication link) facilitated by the I/O module 118. Specifically, the interaction module 304 is configured to establish a bi-directional interaction session between the first The interaction session can be established between the first display 126 and the second display 128 in various ways. For example, a direct connection (e.g., a communication link) for real-time data transfer between the first display 126 and the second display 128 (e.g., wired or wireless) or an indirect connection for real-time data transfer (e.g., via the Internet, a vehicle network) between the first display 126 and the second display 126. In addition to the connection types described above, the interaction session can be implemented utilizing an application to executed the methods described herein. The application can be stored in the vehicle computing system 104 (e.g., the memory 110, and/or the disk 112) and executed by the processor 108 or the application can be stored and processed by the device hosting the first display 126 and/or the second display 128. Further, the application can be downloaded from the Internet or a vehicle network to the vehicle computing system 104 and/or the device hosting the first display 126 or the second display 128. Other technologies and configurations for real-time data transfer between the first display 126 and the second display 128 can be implemented with the embodiments discussed herein.

The interaction module 304 can be configured to establish the bi-directional interaction session upon detecting an initialization event. In one embodiment, the initialization event can include a request for interaction indicating an other display (e.g., a further display, a second display) that is communicatively coupled to the vehicle. The initialization event can be a user input (i.e., an interaction input) detected and/or received by the interaction module 304. As an illustrative example, the interaction module 304 can receive a request for interaction from a first user via an interaction input. Referring to FIG. 2, the driver 202 and/or the passenger 208 may initiate the bi-directional interaction session utilizing a touch input, a speech input, an audio input, or any combination thereof. The request can indicate the other display (e.g., the first display 126; the second display 128) for interaction. Based on the request, the interaction module 304 can establish an interaction session between the first display 126 and the second display 128.

In another embodiment, the other display is predefined and based on a rule set (e.g., user preferences) stored at the vehicle computing device 104, for example, at the memory 110 and/or the disk 112. The rule set provides rules for interaction based on different characteristics that include, but are not limited to, an identity of a user, an identity of a display, a temporal characteristic of the request and/or a current status of the vehicle 102. As an illustrative example, the interaction module 304 can receive a request for interaction from a first user via a user input at the first display 126. The request can include the identity of the first user and the first display 126. The interaction module 304 can compare the request with the rule set to determine the one other device and determine whether to establish the interaction session with the one other device. For example, based on the rule set the interaction module 304 can determine that the first display 126 has permission to establish an interaction session only at certain time periods (e.g., temporal characteristics) or during certain events (e.g., when the vehicle 102 is stopped based on a current status of the vehicle 102).

Further, the interaction module 304 can establish the interaction session automatically based on data received from the sensors 124. For example, the interaction session can be established automatically between the first display 126 and the second display 128 by the interaction module 304 upon detecting an engine and/or ignition ON signal. Moreover, the interaction module 304 can be configured to terminate the interaction session upon detecting a termination event, which can be similar to the initialization event discussed above.

In a further embodiment, the interaction module 304 is configured to establish the interaction session upon detecting an initialization event, wherein the initialization event includes a request for interaction and an authorization for interaction. For example, and in further view of the illustrative example discussed above, upon detecting and/or receiving the request for interaction from the first display 126, the interaction module 304 can transmit a request for authorization to the one other display (e.g., the second display 128). In response, the interaction module 304 can detect and/or receive an authorization for interaction from the one other display, for example, based on a user input. Upon receiving the authorization for interaction, the interaction module 304 can establish the interaction session with the first display 126 and the second display 128. This allows a user to accept and/or reject a request for interaction from another user.

Referring again to the example illustrated in FIG. 2, the interaction module 304 can establish an interaction session between the HUD 204 and the passenger display 210. The interaction session can be established based upon detection of an initialization event. In one example, the initialization event is a request for interaction (e.g., a user input from the passenger 208) indicating an other display communicatively coupled to the vehicle for selective interaction. Specifically, a list of devices/displays (not shown), including the HUD 204, can be presented to the passenger 208 (e.g., via the passenger display 210) thereby allowing the passenger 208 to select and indicate the other display (i.e., the HUD 204) for interaction.

In another example, speech recognition utilizing a geo-semantic or geo-location database can be used to recognize a speech input (e.g., a speech utterance) as a request for interaction with at least one other display. As a non-limiting example, and with reference to FIG. 2 the driver 202 may utter, "Share my point of view" (not shown). The image acquisition and processing module 302, utilizing the sensors 124 (e.g., an audio sensor), could detect the speech utterance and can perform speech recognition to process the utterance. The interaction module 304, upon detecting the utterance or receiving the utterance from the image acquisition and processing module, can identify the utterance as an initialization event and thereby establish the interaction session between the HUD 204 and the passenger display 210. In one embodiment, the augmented reality object module 306 may automatically generate an augmented reality object based on initialization event and transmit the augmented reality object to the passenger display 210. For example, and as will be discussed in more detail below, the interaction input module 304 can receive a real-time point of view of the driver 202, indicated by element 216, from the image acquisition and processing module 302 utilizing data from the sensors 124 (e.g., eye tracking data). The augmented reality module 304 can generate an augmented reality object based on the real-time point of view of the driver 202 and render the augmented reality object on the passenger display 210, providing real-time feedback of the driver's point of view to the passenger 208 as the passenger's view 218.

In another embodiment, upon receiving the request for interaction, the interaction module 304 can transmit a request for authorization to the HUD 204. The request can be output to the HUD 204 and displayed. In response, the driver 202 can accept or reject the request for authorization via user input. If the request for authorization is accepted, the interaction module 304 can establish the interaction session. This allows the driver 202 to control requests for interaction with other devices and/or displays.

Referring again to FIG. 5, the interaction module 304 is configured for receiving interaction input. In some embodiments, the image acquisition and processing module 302 and the interaction module 204 can include provisions for gesture recognition, speech recognition, eye-tracking, head-tracking, among others, utilizing data received from the sensors 124. More specifically, the interaction module 304 is configured to receive a first interaction input associated with the first user. Further, the augmented reality module 306 is configured for generating a first augmented reality object based on the first interaction input and rendering the first augmented reality object on the second display. In another embodiment, the interaction module 304 is configured for receiving a second interaction input associated with the second user. The augmented reality module 306 is also configured to generate a second augmented reality object based on the second interaction input and rendering the second augmented reality object on the second display.

Referring now to the example illustrated in FIG. 2, the driver 202 is currently viewing (i.e., the driver's view 214) real world images (e.g., building 1, building 2, building 3, building 4) via the front windshield 206. In one embodiment, upon receipt of an interaction input and/or upon establishing a bi-directional interaction session as discussed above, the interaction input module 304 receives an interaction input and the augmented reality module 304 can generate an augmented reality object based on the interaction input. Referring to the example above, the driver 202 may utter, "Share my point of view" (not shown). The image acquisition and processing module 302, utilizing the sensors 124 (e.g., an audio sensor), can detect the speech utterance and perform speech recognition to process the utterance. The interaction module 304, upon detecting the utterance or receiving the utterance from the image acquisition and processing module, can identify the utterance as an initialization event and thereby establish the interaction session between the HUD 204 and the passenger display 210. In one embodiment, the augmented reality object module 306 may automatically generate an augmented reality object based on initialization event and transmit the augmented reality object to the passenger display 210. For example, the augmented reality object can include a real-time point of view of the driver 202, indicated by element 216. The real-time point of view of the driver 202 is determined by the image acquisition and processing module 302 utilizing data from the sensors 124 (e.g., eye tracking data). The augmented reality module 304 generates an augmented reality object based on the interaction input (i.e., "Share my point of view) and generates an augmented reality object comprising a real-time point of view of the driver 202. The real-time point of view of the driver 202 is then rendered on the passenger display 210.

Figure 3A:
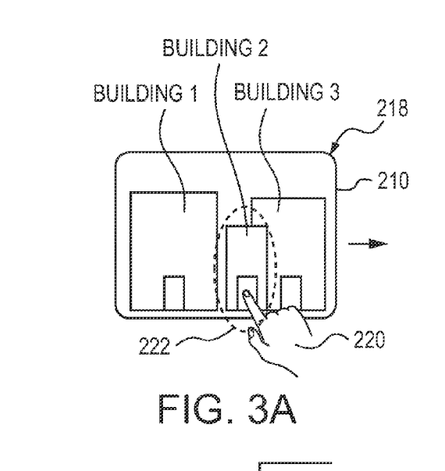
FIG. 3A is a simplified schematic view of the vehicle similar to FIG. 2, showing a passenger view according to another exemplary embodiment.

In a further embodiment shown in FIG. 3A, the passenger display 210 is currently displaying the passenger view 218 comprising as a real-time point of view of the driver 202. Upon receiving a first interaction input by the interaction module 304, the augmented reality module 304 can generate a first augmented reality object based on the first interaction input. In one embodiment, the augmented reality module 306 generates the first augmented reality object based on the first interaction input and a local view (i.e., the passenger view 218) displayed on the first display. An interaction input can be a touch input, a gesture input, a speech input and/or a system input. In FIG. 3A, the passenger 208 has selected building 2 on the passenger view 218 via an interaction input 220 (i.e., a touch input on the passenger display 210). In another embodiment, a speech input can be received as an interaction input, for example, the passenger 208 can utter in the vehicle 102 "I think the restaurant is the building in the middle" (not shown). In another embodiment, the interaction input can be a hand gesture indicating the building in the middle, for example, a pointing gesture. The various types of interaction input discussed herein can be sensed and processed by the sensors 124 and/or components of the first display 126 and the second display 128 (e.g., using speech and gesture recognition, geo-spatial data of multi-modal data (e.g., images, audio) received by the sensors 124).

Figure 3B:
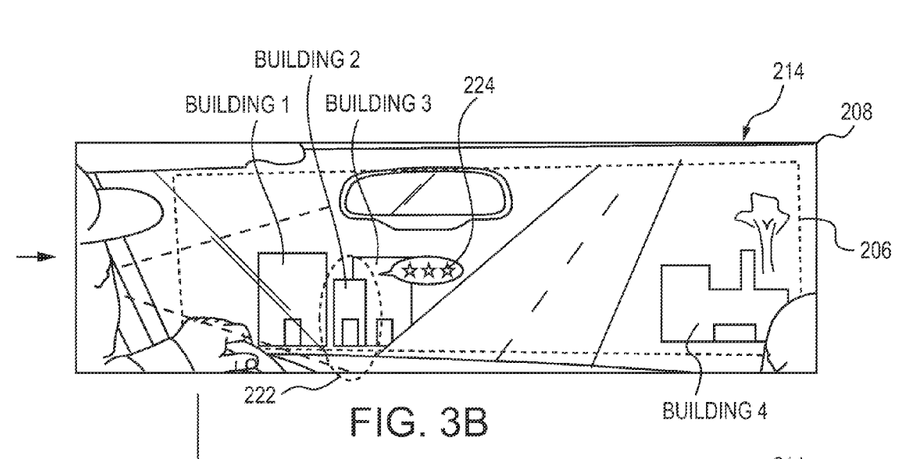
FIG. 3B is a simplified schematic view of the vehicle similar to FIG. 2, but showing a driver view another exemplary embodiment.

Based on the first interaction input, the augmented reality module 306 generates a first augmented reality object 222. In FIG. 3A, the first augmented reality object 222 is based on the first interaction input 220 and the local view (i.e., the passenger view 218), resulting in a highlight around building 2. In FIG. 3A, the first augmented reality object 222 is rendered on the passenger display 210. The augmented reality module 306 can transmit and render the first augmented reality object 222 on the HUD 204 as seen in FIG. 3B. The first augmented reality object 222 can be rendered as an annotation at a position corresponding to the real image of building 2 based on the driver's current point of view.

In another embodiment, for example, if building 2 is no longer in the driver's point of view, the first augmented reality object 222 can be a stand alone image displayed on the HUD including the passenger's view 218 in FIG. 3A (i.e., including the image of building 1, building 2 and building 3 and the augmented reality object 222). Said differently, the augmented reality object can be based on the interaction input (i.e., the interaction input 220) and a local view (i.e., the passenger view 218 in FIG. 3A.

Figure 3C:
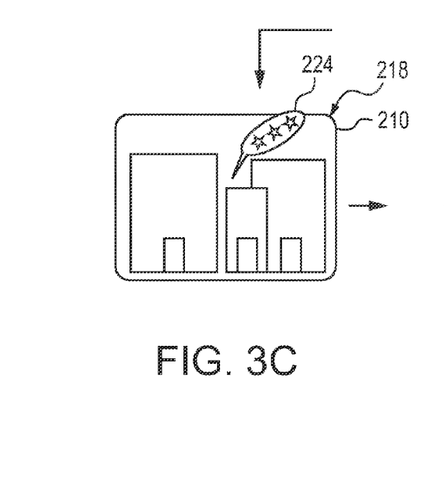
FIG. 3C is a simplified schematic view of the vehicle similar to FIG. 2, but showing a passenger view according to another exemplary embodiment.

In a further embodiment, upon receiving a second interaction input by the interaction module 304, the augmented reality module 304 can generate a second augmented reality object based on the second interaction input. In another embodiment, the augmented reality module 306 generates the second augmented reality object based on the second interaction input and a local view displayed on the second display. Referring again to FIG. 3A, the HUD 204 (e.g., using the GPS 114, the Internet, among others) may search for a rating associated with a restaurant located at building 2 indicated by the first augmented reality object 222. The search can be initiated by the driver 202 or automatically by the HUD 204. The output of the search result can be a type of interaction input. Thus, upon receiving the second interaction input, the augmented reality module 304 can generate a second augmented reality object 224. The second augmented reality object 224 is graphic annotation indication a rating associated with the restaurant located at building 2. The augmented reality module 304 can render the second augmented reality object 224 on the passenger display 210 as shown in FIG. 3C.

Figure 3D:
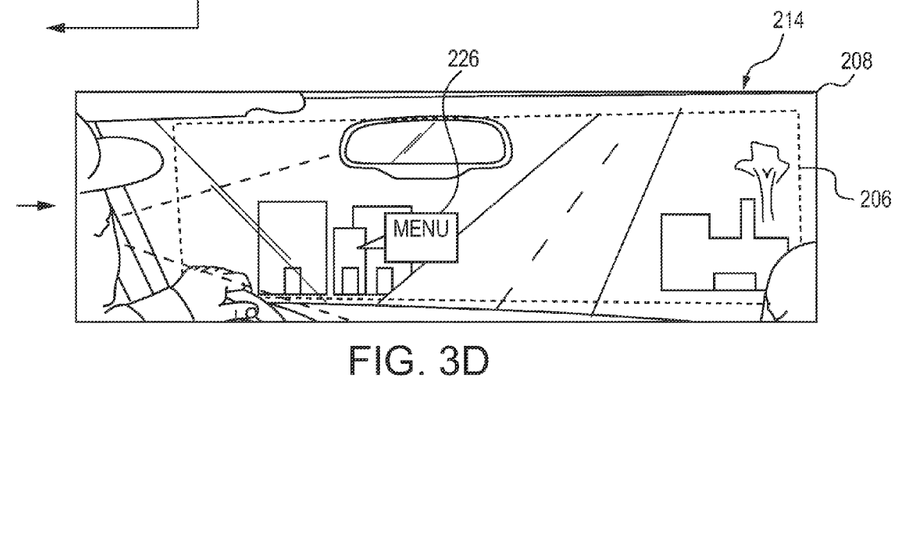
FIG. 3D is a simplified schematic view of the vehicle similar to FIG. 2, but showing a driver view according to another exemplary embodiment.

Further iterations of interaction can be provided by the in-vehicle interaction system 120. For example, in response to viewing the restaurant rating (i.e., the second augmented reality object 224), the passenger 208 can look up a menu of the restaurant located at building 2 using the passenger device 210 (e.g., via a search query on the Internet). The menu returned from the search query can be a type of interaction input. In response, the augmented reality module 306 can generate another augmented reality object 226 and render the augmented reality object 226 (i.e., the menu of the restaurant located at building 2) at a position associated with the building 2 on the HUD 204 as shown in FIG. 3D.

Method for In-Vehicle Interaction and Examples

Figure 6:
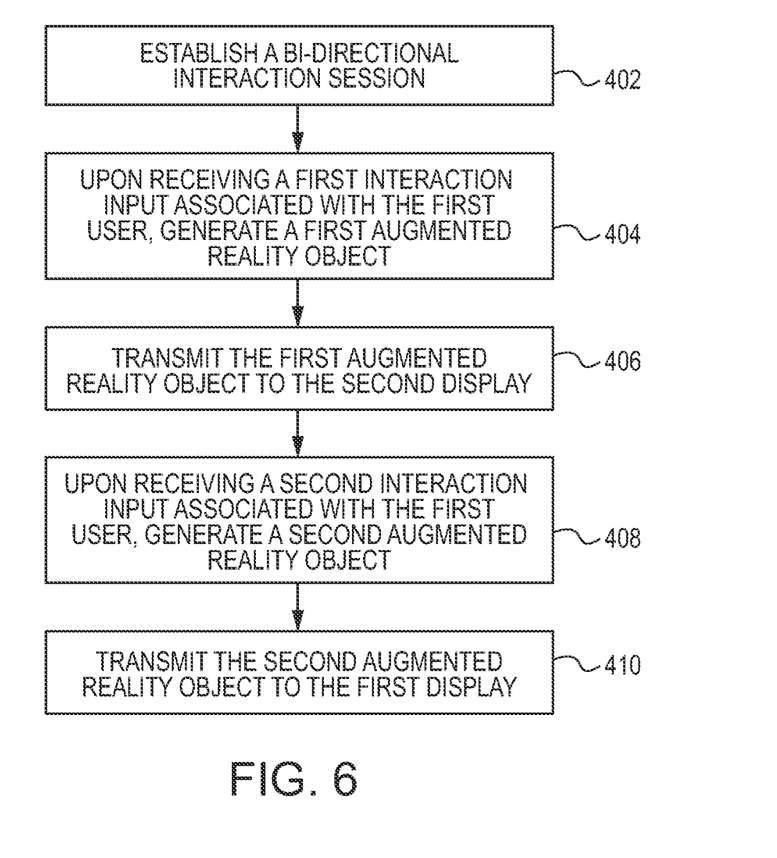
FIG. 6 is a flow chart illustrating a method for interaction in a vehicle according to an exemplary embodiment.

Referring now to FIG. 6, a method is shown for interaction in a vehicle according to one exemplary embodiment. The method of FIG. 6 will be described with reference to the systems and components of FIGS. 1 and 2, 3A-3D, 4A-4D and 5, though it is to be appreciated that the method could be used with other systems and components. The method of FIG. 6 includes, at step 402, establishing a bi-directional interaction session between a first display and a second display via a communication link, wherein each of the first display and the second display are communicatively coupled to the vehicle. Establishing the bi-directional interaction session enables real-time display and augmentation of data between the first display and the second display, wherein the data is received from a plurality of sensors disposed about the vehicle. For example, data can be received from the plurality of sensors 124 disposed on the vehicle 102.

Further, the first display is operated by a first user and the second display is operated by a second user. For example, in one embodiment, one of the first display 126 and the second display 128 is a driver display operated by a driver of the vehicle 102 and the other of the first display 126 or the second display 128 is a passenger display operated by a passenger of the vehicle 102. A driver 202 can view and/or operate a heads-up display (HUD) 204 projected on a front windshield 206 of the vehicle 102, and a passenger 208 can view and/or operate a passenger display 210 mounted in the vehicle 102. A driver view is generally indicated by numeral 214 and is a local view perceivable to the driver through the front windshield 206 and the HUD 204. For example, the driver's view 214 (i.e., the driver's local view) includes real images (e.g., a building 1, a building 2, a building 3, a building 4) viewable through the HUD 204 and virtual and/or augmented data projected on the HUD 204 (shown in FIGS. 2B and 2C). In some embodiments, other passengers in the vehicle 102 can also view portions of the driver view 214. A passenger view is generally indicated by a numeral 218 and includes a local view perceivable to the passenger on the passenger display 210. For example, in FIG. 2, the passenger view 218 (i.e., the passenger's local view) includes images and data rendered for display on the passenger display 210. In some embodiments, other passengers in the vehicle 102 can also view portions of the passenger view 218 displayed on the passenger display 210.

In one embodiment, establishing the bi-directional interaction session includes establishing the bi-directional interaction session upon detecting an initialization event. The initialization event includes a request for interaction and indicates one other display communicatively coupled to the vehicle for interaction. As discussed above, the initialization event can be a user input (i.e., an interaction input) detected and/or received by the interaction module 304.

In a further embodiment, an authorization status can be determined based on the request for interaction For example, upon receiving a request for interaction from the first display 126, the request identifying the second display 128, the interaction module 304 can determine an authorization status associated with the second display 128. The authorization status can be determine in various ways. In one example, the interaction module 304 can transmit a request for authorization to the second display 128. In response, the interaction module 304 can detect and/or receive an authorization for interaction from the second display 128, for example, based on a user input. Upon receiving the authorization for interaction, the interaction module 304 and/or the augmented reality module 306 can display an accept or reject command box (e.g., as an augmented reality object) to allow a user to accept and/or reject a request for interaction from another user.

In another example, the authorization status can be predefined and retrieved from the vehicle computing device 104, for example, at the memory 110 and/or the disk 112. Alternatively, the authorization status can be based on different characteristics that include, but are not limited to, an identity of a user, an identity of a display, a temporal characteristic of the request and/or a current status of the vehicle 102. As an illustrative example, the interaction module 304 can receive a request for interaction from a first display 126 communicatively coupled to the vehicle 102 and operated by a first user. The request can include the identity of the first user and the first display 126 as well as the second user and the second display 128. The interaction module 304 can compare the request with the rule set to determine an authorization status of the second display 128. For example, based on the rule set the interaction module 304 can determine that the second display 128 has permission to establish an interaction session only at certain time periods (e.g., temporal characteristics) or during certain events (e.g., when the vehicle 102 is stopped based on a current status of the vehicle 102). Accordingly, the method of FIG. 6 allows for real-time display and augmentation of the imagery data between the first display 126 and the second display 128. Additionally, display and augmentation of the imagery data can be controlled via the authorization status.

At step 404, upon receiving a first interaction input associated with the first user, the method includes generating a first augmented reality object based on the first interaction input. At step 406, the method includes transmitting via the communication link the first augmented reality object to the second display for displaying the first augmented reality object on the second display. In one embodiment, the first augmented reality object is based on the first interaction input and a local view display on the first display.

Referring now to the example illustrated in FIG. 4A, the passenger display 210 is displaying a real-time point of view of the passenger 208 as passenger view 218. The passenger 208 can utter "Look at that over there!" which is received and processed by the image acquisition and processing module 302 and the interaction module 304 as interaction input 228. Upon receiving the interaction input 228, a first augmented reality object is generated based on the first interaction input 228. For example, a real-time point of view of the passenger 208 is generated as a first augmented reality object 230. The first augmented reality object 230 is transmitted via the communication link and displayed on the HUD 204 as shown in FIG. 4B.

At step 408, upon receiving a second interaction input associated with the second user, the method includes generating a second augmented reality object based upon the second interaction input. At step 410, the method includes transmitting via the communication link the second augmented reality object to the first display for displaying the second augmented reality object on the first display. In one embodiment, the second augmented reality object is based on the second interaction input and a local view displayed don the second display.

For example, in view 4B, the driver 202 may utter "Can you find out what that is?" indicated as element 232. In response, the passenger 208 and/or the passenger display 210 initiates a search at the passenger display 210 as seen in FIG. 4C. The results of the search can be a second interaction input. The augmented reality module 306 generates a second augmented reality object 234, a webpage describing the building in the passenger's real-time point of view and transmits the second augmented reality object 234 to the driver display 210 as shown in FIG. 4D.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for interaction in a vehicle, comprising:
    establishing a bi-directional interaction session via a communication link between a heads-up display operated by a driver and a passenger display operated by a passenger, wherein the heads-up display and the passenger display are communicatively coupled to the vehicle, and wherein the passenger display is physically separate from the heads-up display;
    upon receiving a first interaction input from the driver associated with a point of interest in a real-time point of view of the driver viewed through the heads-up display, generating a first augmented reality object based on the first interaction input, the point of interest, and the real-time point of view of the driver, and displaying the first augmented reality object on the heads-up display;
    transmitting via the communication link the first augmented reality object to the passenger display for displaying the first augmented reality object on the passenger display;
    upon receiving a second interaction input from the passenger at the passenger display, determining if the point of interest is visible by the driver in an updated real-time point of view of the driver viewed through the heads-up display;
    generating a second augmented reality object based upon the second interaction input, the first augmented reality object, and the determination of whether the point of interest is visible by the driver; and
    transmitting via the communication link the second augmented reality object to the heads-up display for displaying the second augmented reality object on the heads up display in accordance with the determination of whether the point of interest is visible by the driver;
    wherein upon determining the point of interest is visible by the driver in the updated real-time point of view of the driver viewed through the heads-up display, transmitting via the communication link the second augmented reality object includes transmitting via the communication link the second augmented reality object to the heads-up display for displaying the second augmented reality object on the heads-up display at a location corresponding to the point of interest in the updated real-time point of view of the driver;
    wherein upon determining the point of interest is not visible by the driver in the updated real-time point of view of the driver viewed through the heads-up display, generating the second augmented reality object includes generating the second augmented reality object based on a local view perceivable to the passenger on the passenger display and transmitting via the communication link the second augmented reality object to the heads-up display.

2. The method of claim 1, wherein establishing the bi-directional interaction session includes establishing the bi-directional interaction session based on an initialization event.

3. The method of claim 1, wherein establishing the bi-directional interaction session includes displaying a request for interaction as an augmented reality object on the heads-up display or the passenger display, the request for interaction indicating one other display communicatively coupled to the vehicle for interaction.

4. The method of claim 3, wherein establishing the bi-directional interaction session includes receiving an input in response to the request for interaction from the heads-up display or the passenger display.

5. The method of claim 4, wherein establishing the bi-directional interaction session includes establishing the bi-directional interaction session based on the input.

6. The method of claim 1, wherein transmitting via the communication link the second augmented reality object to the heads-up display for displaying the second augmented reality object includes displaying the second augmented reality object as a standalone image on the heads-up display.

7. A non-transitory computer-readable storage medium storing instructions that, when executed by a vehicle computer, causes the vehicle computer to perform a method including:
  establishing a bi-directional interaction session via a communication link between a heads-up display operated by a driver and a passenger display operated by a passenger, wherein the heads-up display and the passenger display are communicatively coupled to the vehicle, and wherein the passenger display is physically separate from the heads-up display;
  upon receiving a first interaction input from the driver associated with a point of interest in a real-time point of view of the driver viewed through the heads-up display, generating a first augmented reality object based on the first interaction input, the point of interest, and the real-time point of view of the driver, and displaying the first augmented reality object on the heads-up display;
  transmitting via the communication link the first augmented reality object to the passenger display for displaying the first augmented reality object on the passenger display;
  upon receiving a second interaction input from the passenger at the passenger display, determining if the point of interest is visible by the driver in an updated real-time point of view of the driver viewed through the heads-up display;
  generating a second augmented reality object based upon the second interaction input, the first augmented reality object, and the determination of whether the point of interest is visible by the driver; and
  transmitting via the communication link the second augmented reality object to the heads-up display for displaying the second augmented reality object on the heads up display in accordance with the determination of whether the point of interest is visible by the driver;
  wherein upon determining the point of interest is visible by the driver in the updated real-time point of view of the driver viewed through the heads-up display, transmitting via the communication link the second augmented reality object includes transmitting via the communication link the second augmented reality object to the heads-up display for displaying the second augmented reality object on the heads-up display at a location corresponding to the point of interest in the updated real-time point of view of the driver;
  wherein upon determining the point of interest is not visible by the driver in the updated real-time point of view of the driver viewed through the heads-up display, generating the second augmented reality object includes generating the second augmented reality object based on a local view perceivable to the passenger on the passenger display and transmitting via the communication link the second augmented reality object to the heads-up display.

8. The non-transitory computer-readable storage medium of claim 7, wherein establishing the bi-directional interaction session includes displaying a request for interaction as an augmented reality object on the heads-up display or the passenger display, the request for interaction indicating one other display communicatively coupled to the vehicle for interaction.

9. The non-transitory computer-readable storage medium of claim 8, wherein establishing the bi-directional interaction session includes receiving an input in response to the request for interaction from the heads-up display or the passenger display, and wherein establishing the bi-directional interaction session includes establishing the bi-directional interaction session based on the input.

10. The method of claim 7, wherein transmitting via the communication link the second augmented reality object to the heads-up display for displaying the second augmented reality object includes displaying the second augmented reality object as a standalone image on the heads-up display.

11. A system for interaction in a vehicle, comprising:
  a heads-up display and a passenger display each communicatively coupled to the vehicle and each configured for bi-directional interaction between the heads-up display and the passenger display; and
  a processor communicatively coupled to the heads-up display, the passenger display, and the vehicle, the processor including an interaction module for receiving a first interaction input from the driver associated with a point of interest in a real-time point of view of the driver viewed through the heads-up display, the processor including an augmented reality module for generating a first augmented reality object based on the first interaction input, the point of interest, and the real-time point of view of the driver, and rendering the first augmented reality object on the heads-up display, wherein the interaction module receives a second interaction input from the passenger at the passenger display and determining if the point of interest is visible by the driver in an updated real-time point of view of the driver viewed through the heads-up display, wherein augmented reality module generates a second augmented reality object based upon the second interaction input, the first augmented reality object, and the determination of whether the point of interest is visible by the driver, and renders the second augmented reality object on the heads up display in accordance with the determination of whether the point of interest is visible by the driver;
  wherein upon determining the point of interest is visible by the driver in the updated real-time point of view of the driver viewed through the heads-up display, the interaction module transmits the second augmented reality object to the heads-up display for displaying the second augmented reality object on the heads-up display at a location corresponding to the point of interest in the updated real-time point of view of the driver;
  wherein upon determining the point of interest is not visible by the driver in the updated real-time point of view of the driver viewed through the heads-up display, the interaction module generates the second augmented reality object based on a local view perceivable to the passenger on the passenger display and transmits the second augmented reality object to the heads-up display.

12. The system of claim 11, wherein the interaction module is configured to detect an initialization event thereby establishing the bi-directional interaction session.

13. The system of claim 11, wherein the interaction module displays a request for interaction augmented reality object on the heads-up display indicating a request for interaction from the passenger display, and receives a user input from the heads-up displays in response to displaying the request for interaction augmented reality object.

14. The system of claim 13, wherein the interaction module is configured to establish the bi-directional interaction session based on the user input.

15. The system of claim 11, wherein the interaction module transmits displays the second augmented reality object as a standalone image on the heads-up display.

\* \* \* \* \*